(12) United States Patent
Kuruma (10) Patent No.: US 7,839,444 B2
(45) Date of Patent: Nov. 23, 2010

(54) SOLID-STATE IMAGE-PICKUP DEVICE, METHOD OF DRIVING SOLID-STATE IMAGE-PICKUP DEVICE AND IMAGE-PICKUP APPARATUS

(75) Inventor: Daisuke Kuruma, Tokyo (JP)

(73) Assignee: Sony Corporation, Tokyo (JP)

( * ) Notice: Subject to any disclaimer, the term of this patent is extended or adjusted under 35 U.S.C. 154(b) by 840 days.

(21) Appl. No.: 11/558,144

(22) Filed: Nov. 9, 2006

(65) Prior Publication Data

US 2007/0126909 A1 Jun. 7, 2007

(30) Foreign Application Priority Data

Nov. 28, 2005 (JP) ............... 2005-341394

(51) Int. Cl.
*H04N 5/222* (2006.01)
(52) U.S. Cl. ............... 348/333.01; 348/220.1; 348/364; 348/365
(58) Field of Classification Search ........... 348/333.01, 348/220.1, 364, 365
See application file for complete search history.

(56) References Cited

U.S. PATENT DOCUMENTS 6,661,451 B1 * 12/2003 Kijima et al. ............ 348/220.1
6,829,008 B1 * 12/2004 Kondo et al. ............... 348/302
6,882,366 B1 * 4/2005 Kijima et al. ............... 348/294
6,906,751 B1 * 6/2005 Norita et al. ............... 348/349

FOREIGN PATENT DOCUMENTS

| JP | 2001-296470 | 10/2001 |
|----|-------------|---------|
| JP | 2002-247443 | 8/2002 |
| JP | 2004-23747 | 1/2004 |
| JP | 2005-86246 | 3/2005 |
| JP | 2005-107252 | 4/2005 |
| JP | 2005-277513 | 10/2005 |

* cited by examiner

*Primary Examiner*—Jason Chan
*Assistant Examiner*—Yih-Sien Kao
(74) *Attorney, Agent, or Firm*—Oblon, Spivak, McClelland, Maier & Neustadt, L.L.P.

(57) ABSTRACT

A solid-state image-pickup device includes a pixel array unit including pixels that include photoelectric transducer two-dimensionally arranged in a matrix and a driving unit for reading out pixel information corresponding to a number of pixels less than the number of pixels included in the pixel array unit as monitoring image information and reading out pixel information corresponding to a predetermined region in the pixel array unit at a cycle shorter than the display cycle of the monitoring image as autofocus image information.

8 Claims, 12 Drawing Sheets

| | MONITORING IMAGE | | CMOS MINIMUM IMAGE SIZE | NUMBER OF PIXELS | NUMBER OF AF LINES |
|---|---|---|---|---|---|
| WITHOUT AF LINE THINNING | VGA | 480 × 640 | 2400 × 3200 | 7680000 | 480 |
| | QVGA | 240 × 320 | 1200 × 1600 | 1920000 | 240 |
| WITH AF LINE THINNING | VGA | 480 × 640 | 2400 × 3200 | 7680000 | 240 |

SOLID-STATE IMAGE-PICKUP DEVICE, METHOD OF DRIVING SOLID-STATE IMAGE-PICKUP DEVICE AND IMAGE-PICKUP APPARATUS

CROSS REFERENCES TO RELATED APPLICATIONS

The present invention contains subject matter related to Japanese Patent Application JP 2005-341394 filed in the Japanese Patent Office on Nov. 28, 2005, the entire contents of which are incorporated herein by reference.

BACKGROUND OF THE INVENTION

1. Field of the Invention

The present invention relates to solid-state image-pickup devices, methods of driving a solid-state image-pickup device, and image-pickup apparatuses.

2. Description of the Related Art

For an image-pickup apparatus, a such as digital still camera, a video camera, or a camera module installed in a portable information terminal, e.g., mobile phone, a solid-state image-pickup device, such as a charge coupled device (CCD) image sensors or a complementary metal oxide semiconductor (CMOS) image sensor, is used as an image input device (image-pickup device).

In general, an image-pickup apparatus has an autofocus (AF) function in which the apparatus is automatically focused on an object. There are various known autofocus methods, such as a phase difference method in which focusing is carried out by measuring the distance to an object with two sensors using the phase difference of the image of the object and a contrast method, also known as a mountain-climbing method, in which a point with the greatest contrast is brought to focus.

An image-pickup apparatus that does not have a special sensor for autofocus, such as an image-pickup apparatus having an autofocus function according to the contrast method, carries out various types of processing, such as generating a captured image for recording on the basis of information from the solid-state image-pickup device, generating a monitoring image to be displayed on a monitor, such as a liquid crystal display (LCD) or a electronic view finder (EVF), and detecting contrast for autofocus.

To generate a monitoring image or to detect contrast for autofocus according to the contrast method, processing can be carried out by using only part, and not all, of the pixel information from the image-pickup device. Therefore, in general, part of the pixel information obtained by thinning the pixel information from the solid-state image-pickup device is used to reduce the processing load and electric consumption.

In the autofocus process according to the contrast method, data sets corresponding to several fields are captured, and a peak value is detected by comparing the data sets. For this reason, more time is required for the processing compared with the time required for autofocus according to the phase difference method. More specifically, since monitoring image generation process and the contrast detection process are carried out simultaneously on the basis of pixel information obtained at one solid-state image-pickup device, the autofocus processing cycle is limited to the cycle V of the monitoring image (i.e., field cycle of 50 Hz or 60 Hz).

As a known method to speed up the autofocus process, a fast AF mode in which the cycle of one field is shortened by reading out information from only part of the image-pickup device after the shutter button is pressed or before static image exposure in continuous shooting is provided (for example, refer to Japanese Unexamined Patent Application Publication No. 2001-296470).

Furthermore, as image signal readout modes, in addition to a draft mode in which image signals corresponding to a predetermined number of pixels among all pixels of the image-pickup device, an automatic focusing mode in which a plurality of images is read out at high speed by reading out image signals corresponding to a number of pixels less than that read out in the draft mode is provided (for example, refer to Japanese Unexamined Patent Application Publication No. 2004-023747).

SUMMARY OF THE INVENTION

However, by employing the known technology described in Japanese Unexamined Patent Application Publication No. 2001-296470, although the speed of the AF processing can be increased, there is a disadvantage in that the monitoring cannot be displayed because a high-speed AF mode is used after the shutter button is pressed or before exposing a still image during continuous shooting.

When pixel information corresponding to area smaller than the monitoring image is read out and AF processing is carried out using the readout pixel information according to the known technology described in Japanese Unexamined Patent Application Publication No. 2004-023747, the monitoring image is displayed by interpolating the pixel information and displaying an enlarged image. Therefore, there are problems in that the image is coarse with low resolution and the image quality is low.

An embodiment of the present invention is provided to solve the above-identified problems. According to an embodiment of the present invention, an image-pickup apparatus capable of carrying out autofocus processing at a cycle shorter than the cycle of a monitoring image while displaying a regular monitoring image is provided. Also, the embodiment of the present invention provides a solid-state image-pickup device that is installed in the image-pickup apparatus and a method of driving the device.

Accordingly, an embodiment of the present invention provides a solid-state image-pickup device including a pixel array unit including pixels, which each include a photoelectric transducer, two-dimensionally arranged in a matrix and a driving unit for reading out pixel information corresponding to a number of pixels less than the number of pixels included in the pixel array unit as monitoring image information and reading out pixel information corresponding to a predetermined region in the pixel array unit at a cycle shorter than the display cycle of the monitoring image as autofocus image information.

In an image-pickup apparatus having an autofocus function, information for autofocus is output from a solid-state image-pickup apparatus at a cycle shorter than the display cycle of monitoring image based monitoring image information. In this way, an autofocus processing system that carried out focus control on the basis of the information for autofocus can carried out the processing for the focus control at a cycle shorter than the monitoring image cycle.

According to an embodiment of the present invention, autofocus processing can be carried out at a cycle shorter than the cycle of a monitoring image while displaying a regular monitoring image.

DESCRIPTION OF THE PREFERRED EMBODIMENTS

An embodiment of the present invention will be described in detail below with reference to the drawings.

Figure 1:
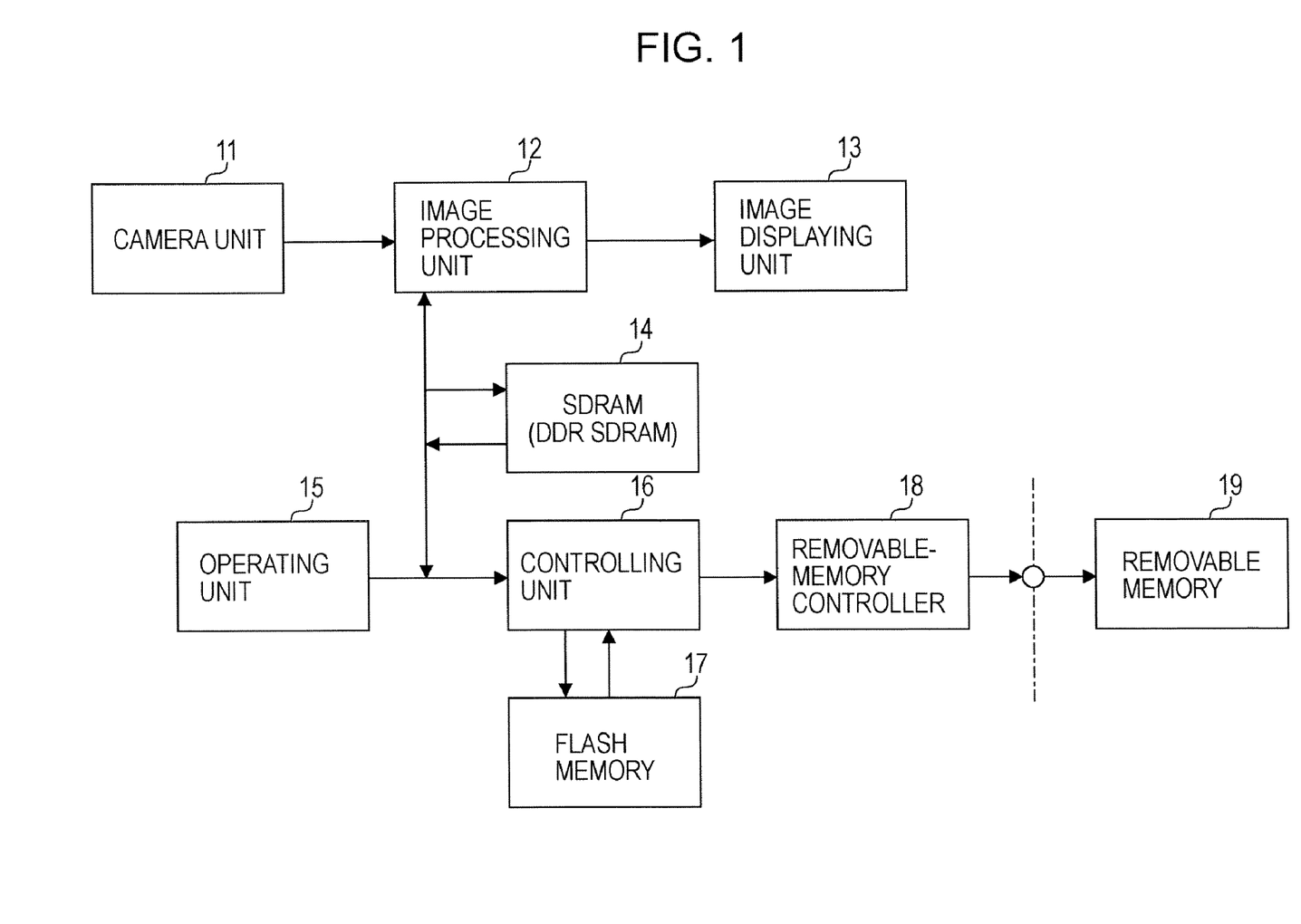
FIG. 1 is a block diagram of the basic structure of a digital camera according to an embodiment of the present invention.

FIG. 1 is a block diagram illustrating the basic structure of an image-pickup apparatus, such as a digital still camera, according to an embodiment of the present invention.

Here, a digital still camera according to this embodiment will be described. However, the scope of the present invention is not limited to digital still cameras and may be employed to any type of image-pickup apparatus having an autofocus function, such as a video camera or a camera module installed in a portable information terminal, e.g., a mobile phone.

As shown in FIG. 1, a digital still camera 10 according to this embodiment includes a camera unit 11, an image processing unit 12, an image displaying unit 13, a synchronous dynamic random access memory (SDRAM) 14, an operating unit 15, a controlling unit 16, a flash memory 17 and a removable-memory controller 18.

The camera unit 11 includes a solid-state image-pickup device, such as a CCD image sensor or a CMOS image sensor, an optical system having a focus lens for forming an image of an object on an imaging plane of the solid-state image-pickup device, a driving circuit for driving the optical system, a timing generator for generating various timing signals to drive the solid-state image-pickup device, and an analog signal processing circuit for processing analog signals output from the solid-state image-pickup device.

The image processing unit 12 carries out signal processing, such as interpolation and pixel mixture, on image signals output from the camera unit 11, generates an image for a recording file and an image for monitoring (i.e., monitoring image) by converting the image signals into brightness signals Y and chrominance signals Cb and Cr, and detects the autofocus (AF) by extracting high frequency components, which change in accordance with the focusing condition, from the brightness signals Y. The image processing unit 12 uses the SDRAM 14 as a buffer when required for carrying out such processes.

The image displaying unit 13 is a monitor, such as a liquid crystal display (LCD) or an electronic view finder (EVF), and displays a monitoring image generated at the image processing unit 12. The operating unit 15 is a user interface including various buttons. The operation information that is generated when the user operates the operating unit 15 is sent to the controlling unit 16. The controlling unit 16 controls the operation of each block on the basis of the information.

The flash memory 17 stores parameters for setting the white balance and other various image-pickup conditions. The removable-memory controller 18 is controlled by the controlling unit 16 so as to read out image data stored in a removable memory 19 and write image data in the removable memory 19. The removable memory 19 includes, for example, a flash memory, such as a MEMORY STICK (registered trademark of Sony Corporation).

Figure 2:
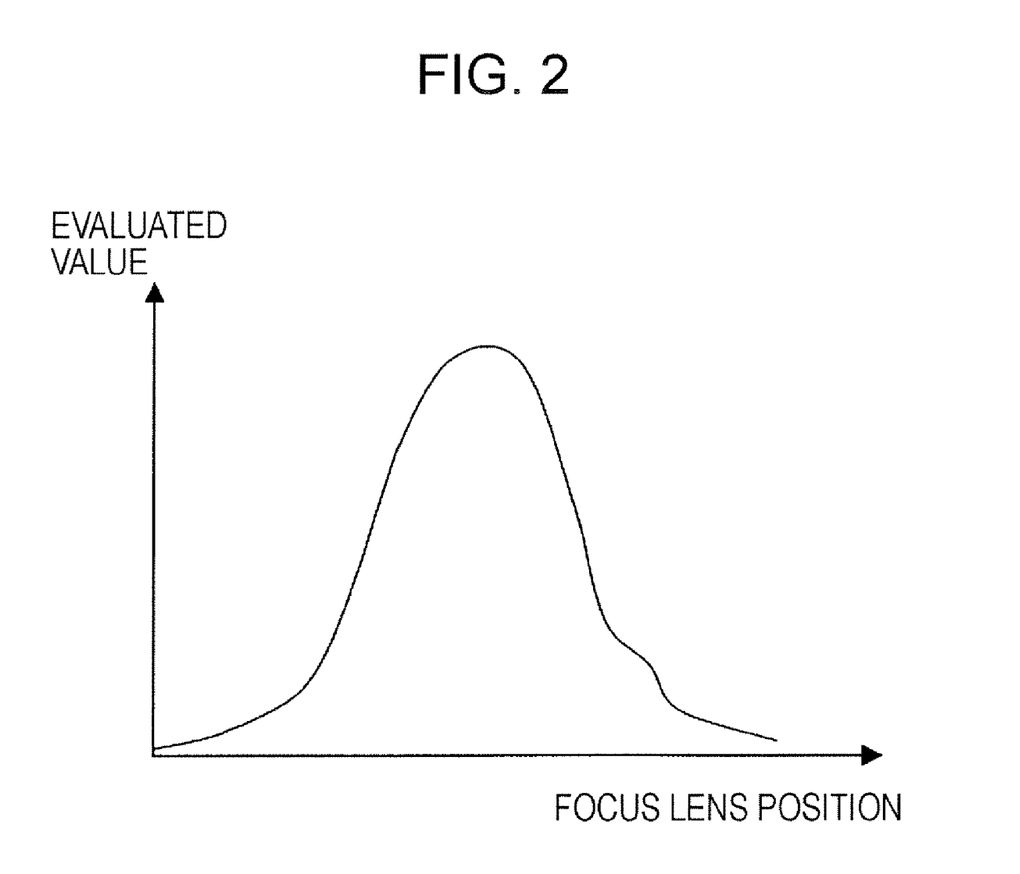
FIG. 2 is a schematic view illustrating the basic principle of automatic focusing according to a contrast method.

Now, the basic principle of autofocus (AF) according to the contrast method, also known as the mountain-climbing method, will be described with reference to FIG. 2.

The image processing unit 12 extracts a high frequency component that changes in accordance with the focusing condition by converting the image signal obtained from the solid-state image-pickup device of the camera unit 11 into a brightness signal Y and passing the brightness signal Y through a high-pass filter. Then, the value of the high frequency component is evaluated on the basis of an AF evaluation frame, and the peak of the evaluated value is detected (i.e., AF detection is carried out) while driving the focusing lens in the camera unit 11 in the optical axis direction. The position of the focusing lens where the evaluated value reaches its peak, i.e., the position of the focusing lens where contrast is maximized, is the focus position.

Figure 3:
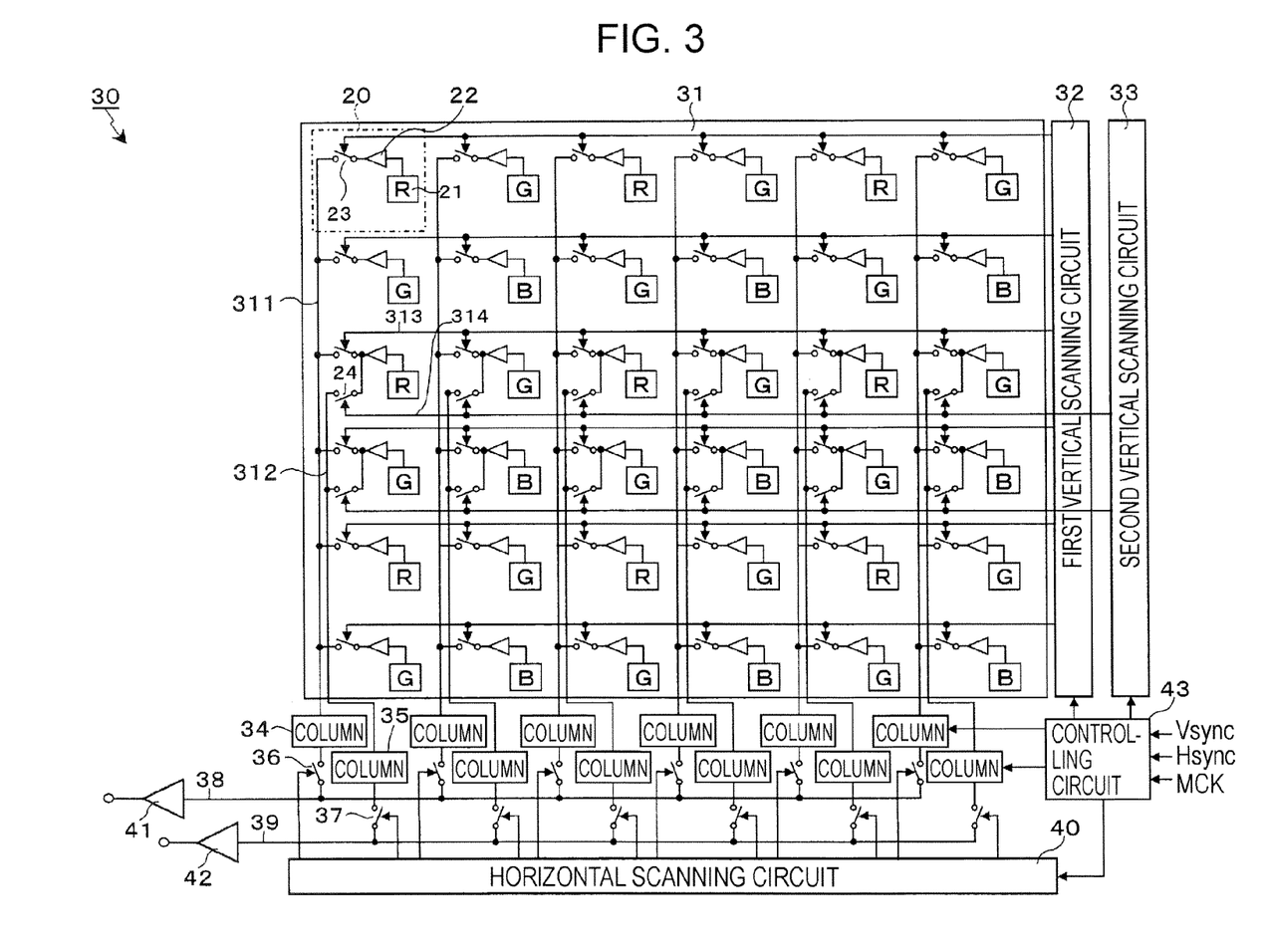
FIG. 3 is a schematic view of the structure of a CMOS image sensor according to an embodiment of the present invention.

FIG. 3 is a schematic view of the structure of a solid-state image-pickup device, such as a CMOS image sensor, according to an embodiment of the present invention and being used as a solid-state image-pickup device included in the camera unit 11. A CMOS image sensor 30 according to this embodiment includes two output systems, i.e., an image output system and an AF output system.

FIG. 3 illustrates a pixel array unit 31 including pixels 20 that are arranged two-dimensionally in a matrix. To simplify the drawing, an example pixel matrix having six row and six columns is illustrated. Color filters whose primary colors, red (R), green (G), and blue (B), are arranged in, for example, a Bayer array are disposed on the pixels 20 of the pixel array unit 31.

Each of the pixels 20 of the pixel array unit 31 includes a photoelectric transducer 21, an amplifier 22, and a selection switch 23. However, this configuration of the pixel 20 is only an example, whereas the actual configuration of the pixel 20 is not limited. The pixels 20 in predetermined rows (the third and fourth rows in this embodiment) are provided with AF selection switches 24, in addition to image selection switches 23.

A first row signal line 311 and a second row signal line 312 are provided for each pixel column of the pixel array unit 31. Each first row signal line 311 is connected to the output terminal of each image selection switch 23 in each pixel 20. Each second row signal line 312 is connected to the output terminal of the AF selection switch 24 of the pixels 20. The pixel array unit 31 also includes a first row selection line 313 for each pixel row. A second row selection line 314 is provided for each of the third and fourth pixel rows.

The ends of the first row selection lines 313 are connected to output terminals, which correspond to every pixel row, of a first vertical scanning circuit 32. The first vertical scanning circuit 32 includes a shift register and address decoder and drives the image selection switches 23 via the first row selection lines 313. The ends of the second row selection lines 314 are connected to the output terminals, which correspond to the third and fourth pixel rows, of a second vertical scanning circuit 33. The second vertical scanning circuit 33 includes a shift register and address decoder and drives the AF selection switches 24 via the second row selection lines 314.

One of the ends of each first row signal line 311 is connected to the input terminal of a first column circuit 34. The first column circuits 34 are column circuits for image lines. Each first column circuit 34 receives signals from the pixels 20 in each row for each pixel column via each corresponding first row signal line 311 and carries out signal processing, such as correlated double sampling (CDS) for removing noise with a fixed pattern dependent to the pixels, on the signals. The first column circuits 34 then temporarily store the processed signals.

One of the end of each second row signal line 312 is connected to the input terminal of a second column circuit 35. The second column circuits 35 are column circuits for AF line. Each second row signal line 312 receives signals from the pixels 20 in the third and fourth rows for each pixel column via each corresponding second row signal line 312 and carries out signal processing, such as CDS, on the signals. The second column circuits 35 then temporarily store the processed signals.

The output terminals of the first column circuits 34 are connected to a first horizontal signal line 38 via first horizontal selection switches 36. The output terminals of the second column circuits 35 are connected to a second horizontal signal line 39 via second horizontal selection switches 37. A horizontal scanning circuit 40 includes a shift register and an address decoder and drives the first and second horizontal selection switches 36 and 37.

When the first and second horizontal selection switches 36 and 37 are driven by selection scanning carried out by the horizontal scanning circuit 40, the signals temporarily stored in the first and second column circuits 34 and 35 are read out to the first and second horizontal signal lines 38 and 39, respectively, and are output via an outputting circuit 41 for images and an outputting circuit 42 for autofocus, respectively.

A controlling circuit 43 receives data including instructions for the operation mode of the CMOS image sensor 30 from a host device (not shown in the drawings), outputs data including information on the CMOS image sensor 30 to the host device, generates clock signals and control signals that are the basis of the operation of the first and second vertical scanning circuits 32 and 33, the first and second column circuits 34 and 35, and the horizontal scanning circuit 40 on the basis of a vertical synchronization signal Vsync, a horizontal synchronization signal Hsync, and a master clock MCK, and sends the signals to each circuit.

The CMOS image sensor 30 having the above-described structure includes, as a vertical scanning system, the second vertical scanning circuit 33 for carrying out scanning for autofocus processing in addition to the first vertical scanning circuit 32 for carrying out scanning to obtain images for a recording file and monitoring images, allows the vertical scanning circuits 32 and 33 to operate independently, and, as an output system, includes the image output system and the AF output system. In this way, while displaying a regular monitoring image on the image displaying unit 13, AF processing according to the contrast method can be carried out faster, i.e., in a cycle shorter, than the monitoring image cycle. In this case, when a still image is being captured, the scanning system and the output system for autofocus are not used.

A detailed example of AF processing that is carried out in a cycle shorter than the cycle of the monitoring image while displaying a regular monitoring image will be described below.

For displaying a monitoring image at an increased frame rate, a known thinning technique is used to thin the pixel information from the CMOS image sensor 30, instead of using all sets of pixel information. More specifically, for example, for the pixel array including 21 rows (lines) shown in FIG. 4, vertical ⅕ thinning is carried out on the pixel information of a monitoring image so that every fifth horizontal line (column) is used.

Figure 4:
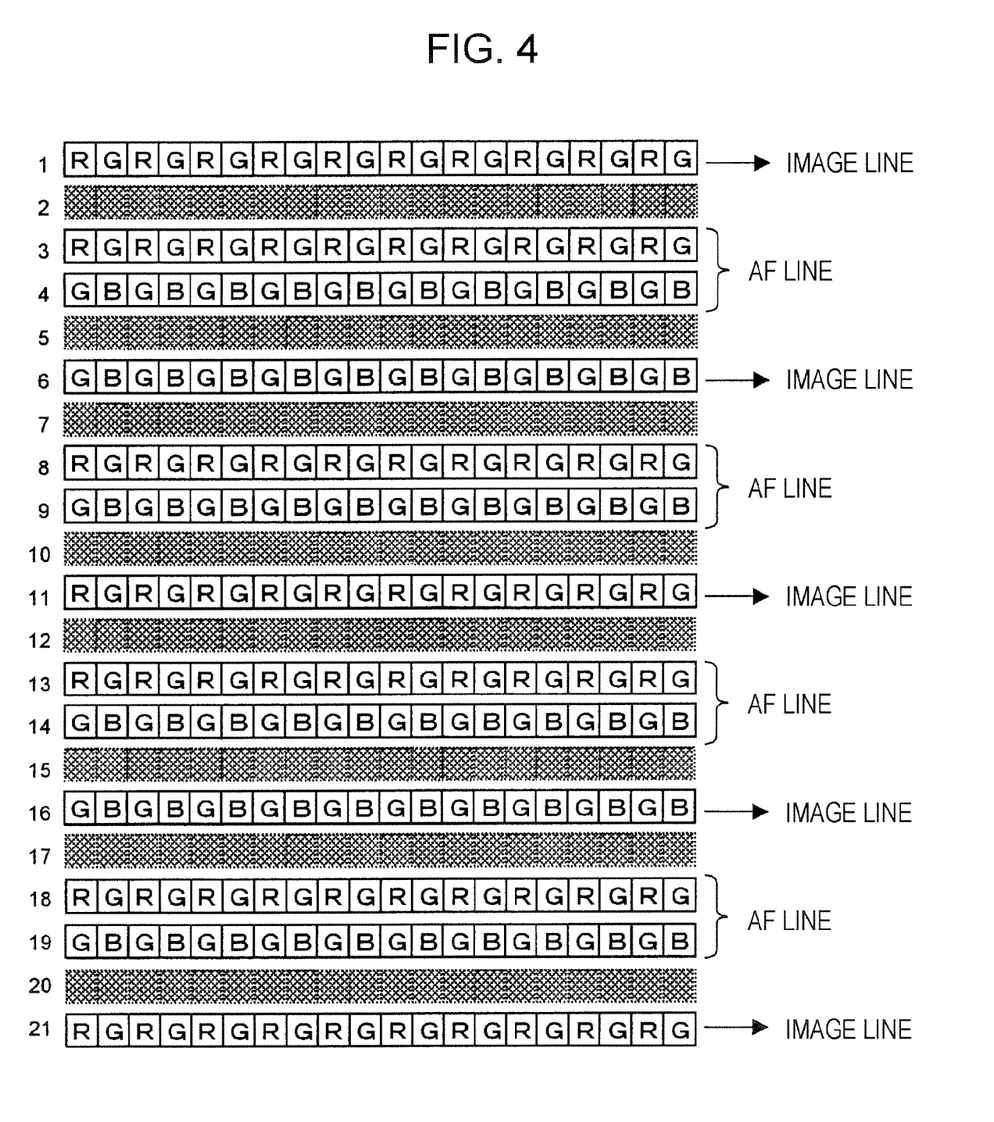
FIG. 4 illustrates high speed readout in automatic focusing.

As lines for AF detection (i.e., AF lines), horizontal lines that are between the image lines and that are not used for the monitoring image are used. By setting two adjacent lines as AF lines, the Bayer array color coding is maintained, as shown in FIG. 4, and the color information of the Bayer array is obtained as image information for autofocus. In this way, more reliable AF control can be provided.

For a monitoring image, usually, a size conforming to video graphics array (VGA) or quarter video graphics array (QVGA) is used. The number or scanning lines required for the VGA size and QVGA size are 480 and 240, respectively. When fewer scanning lines are used, the resolution of the displayed image must be converted and an enlarged image must be displayed. Therefore, the monitoring image becomes coarse, and the quality of the monitoring image is reduced.

Accordingly, when vertical ⅕ thinning is carried out, the CMOS image sensor requires 2,400 horizontal lines to generate a VGA size image and requires 1,200 horizontal lines to generate a QVGA size image. For example, for an image sensor with a vertical-to-horizontal ratio of 3:4, so long as the number of pixels (i.e., [pixels in vertical direction]×[pixels in horizontal direction]) is more than 2,400×3,200 (7.7 million pixels) for generating a VGA size image or 1,200×1,600 (2 million pixels) for generating a QVGA size image, vertical ⅕ thinning can be carried out on the image information for the monitoring image, and the horizontal lines not used for the monitoring image can be used as AF detection lines.

Figure 5:
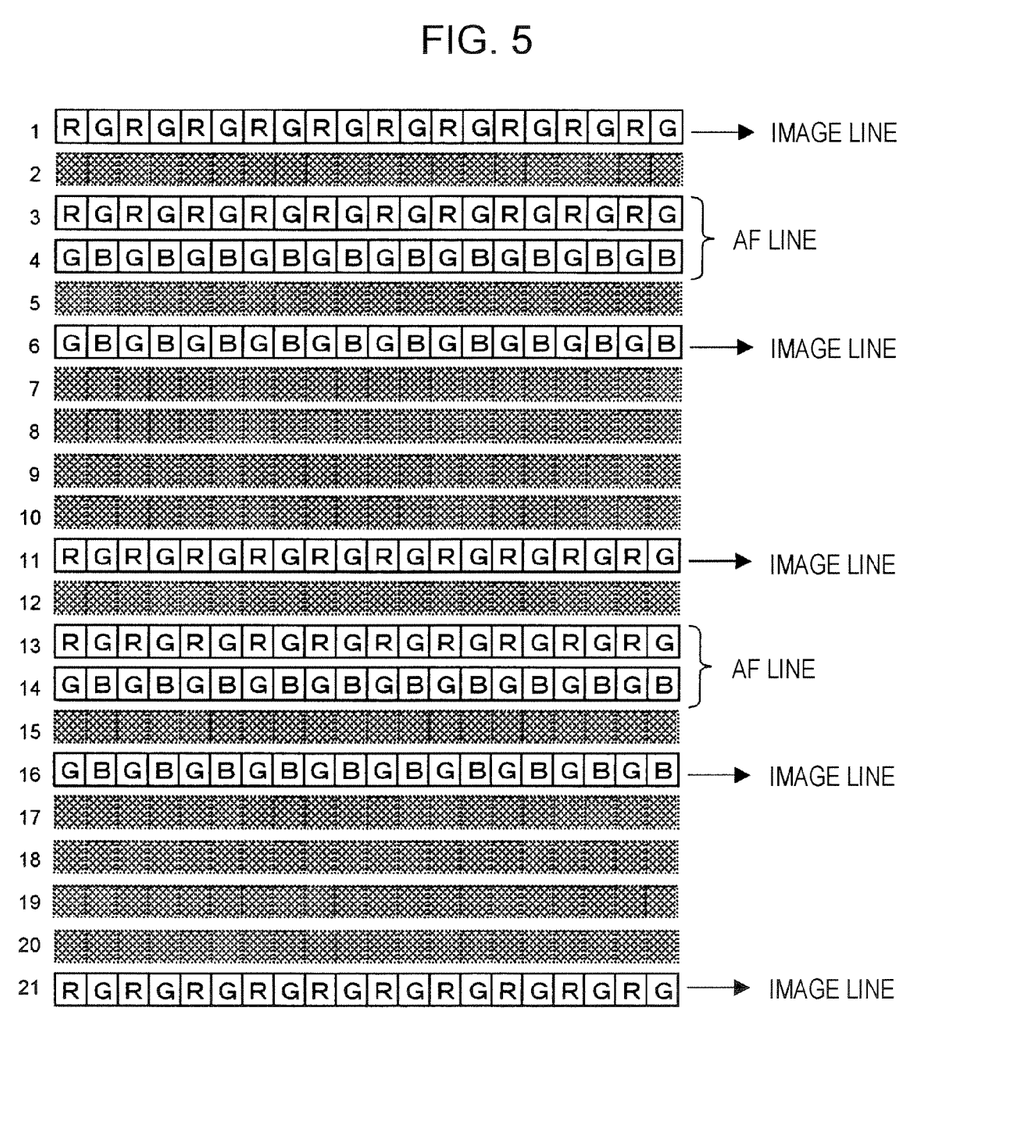
FIG. 5 illustrates high speed readout in automatic focusing with AF-line thinning.
Figure 6:
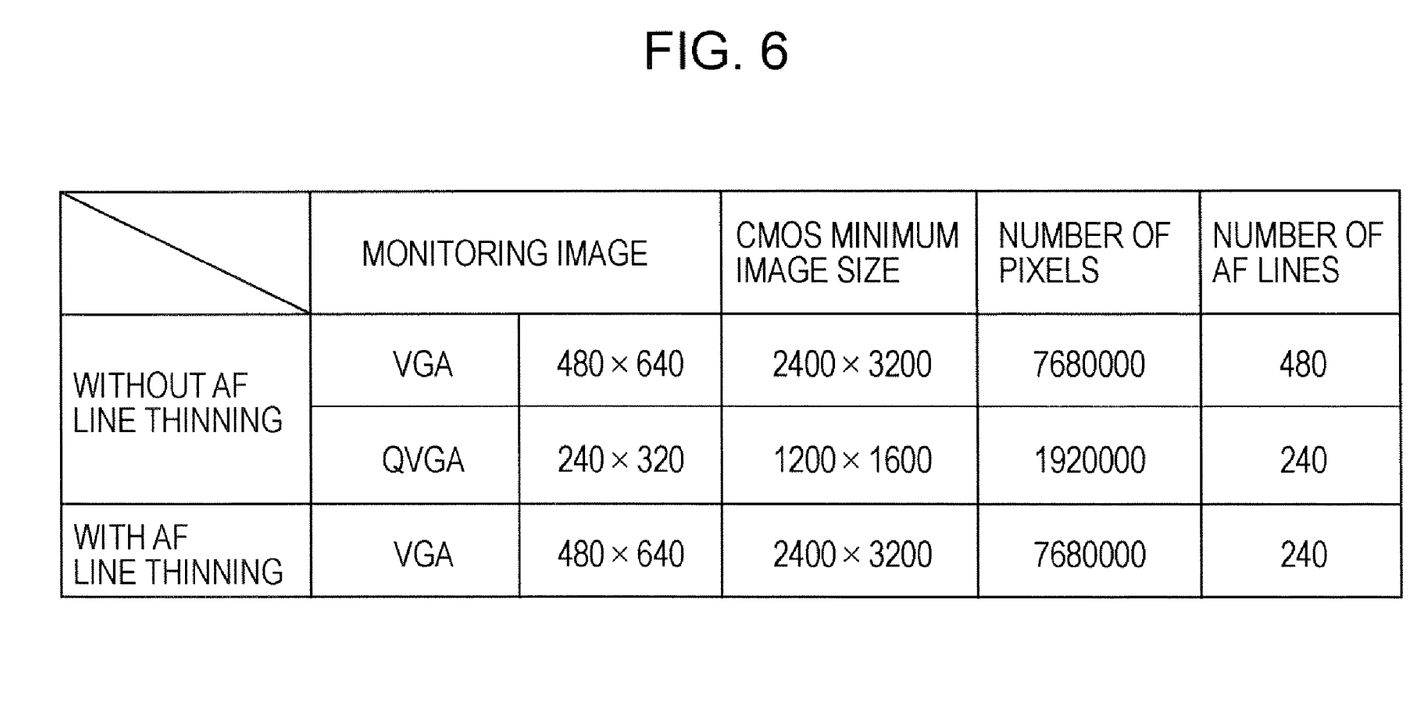
FIG. 6 illustrates the relationship of the number of pixels and horizontal thinning with AF-line thinning and without AF-line thinning.

When the CMOS image sensor 30 includes a great number of pixels and an excessive number of AF lines, for example, half of the AF lines may be thinned. More specifically, when the AF lines are not thinned, as shown in FIG. 4, lines 3, 4, 8, 9, 13, 14, 18, and 19 are set as AF lines, whereas, when half the AF lines can be thinned, as shown in FIG. 5, by not using lines 8, 9, 18, and 19. The relationship between the number of pixels and horizontal thinning is shown in FIG. 6.

For the monitoring image lines, since a sufficient number of pixels are provided in the horizontal lines, for example, horizontal ⅕ thinning in which every fifth pixel is thinned. For the AF lines, for example, horizontal ⅓ thinning is carried out. When data is dense, the amount of computation to be carried out increases, whereas, when data is scarce, the AF performance is reduced. Therefore, the percentage of thinning is determined by achieving a balance.

Figure 7:
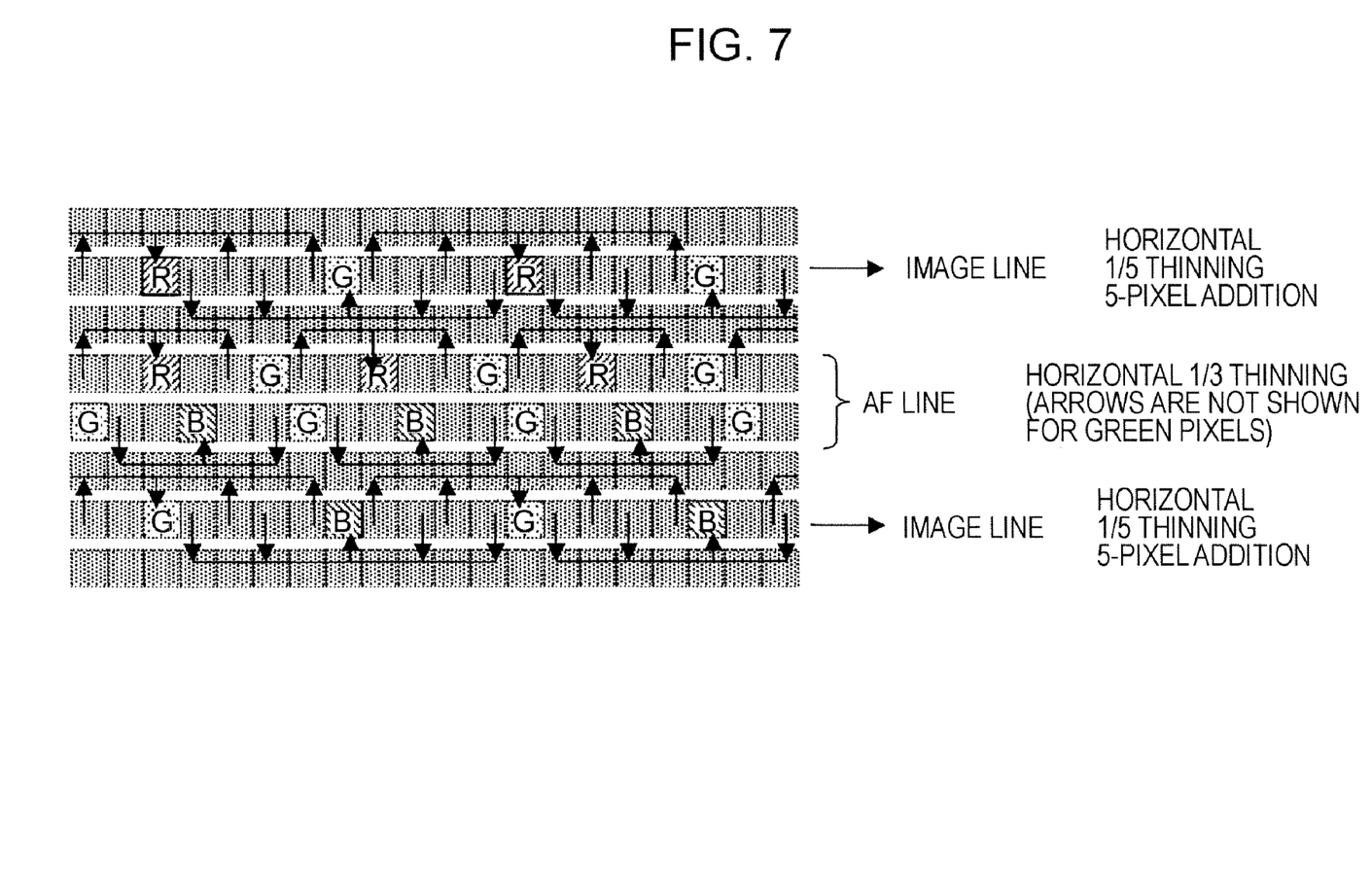
FIG. 7 is a schematic view illustrating horizontal ⅕ thinning and 5-pixel addition carried out on image lines and horizontal ⅓ thinning and 3-pixel addition carried out on AF lines.

Actually, instead of simply reducing the number pixel information sets by thinning, it is preferable to reduce the number of pixel information sets by adding the pixel information of the pixels (i.e., by carrying out pixel addition). This is preferable because, by carrying out pixel addition, the signal volume of each pixel equals substantially a multiple of the number of pixels added. Thus, random noise is reduced, and an image with higher quality can be obtained. As an example, FIG. 7 illustrates the concepts of the horizontal ⅕ thinning and 5-pixel addition carried out on the image lines and horizontal ⅓ thinning and 3-pixel addition carried out on the AF lines.

To carry out AF processing at high speed, the range in which autofocus is to be carried, i.e., a predetermined range provided for measuring the distance between the object and the focus lens (hereinafter, referred to as a "distance-measuring frame"), is defined. For example, modes of a camera include, in addition to a multi AF mode in which autofocus is carried out in the entire screen, a spot AF mode in which a distance-measuring frame is set in the center area of the screen, as shown in FIG. 8A, and a 5-point measurement mode in which autofocus is carried out in a total of five distance-measuring frames set at the center and at the left, right, above, and below the center distance-measuring frame, as shown in FIG. 8B.

Figure 8A:
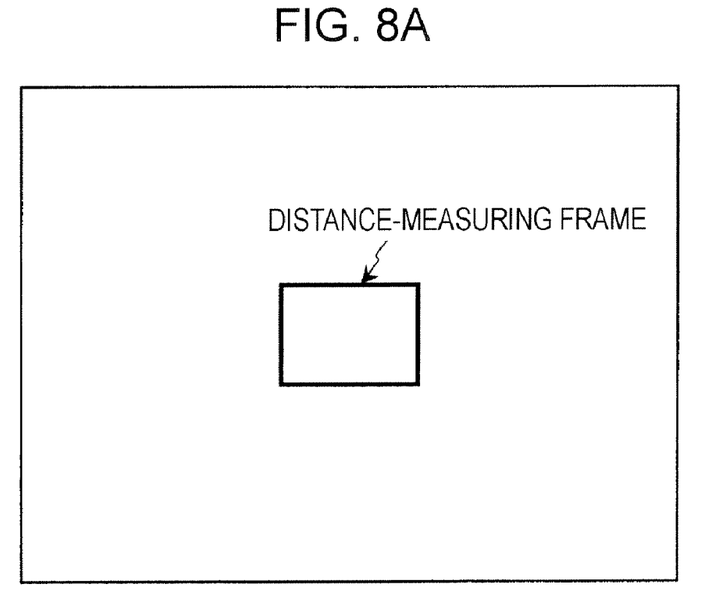
FIGS. 8A and 8B illustrates examples of distance-measuring frames.
Figure 9:
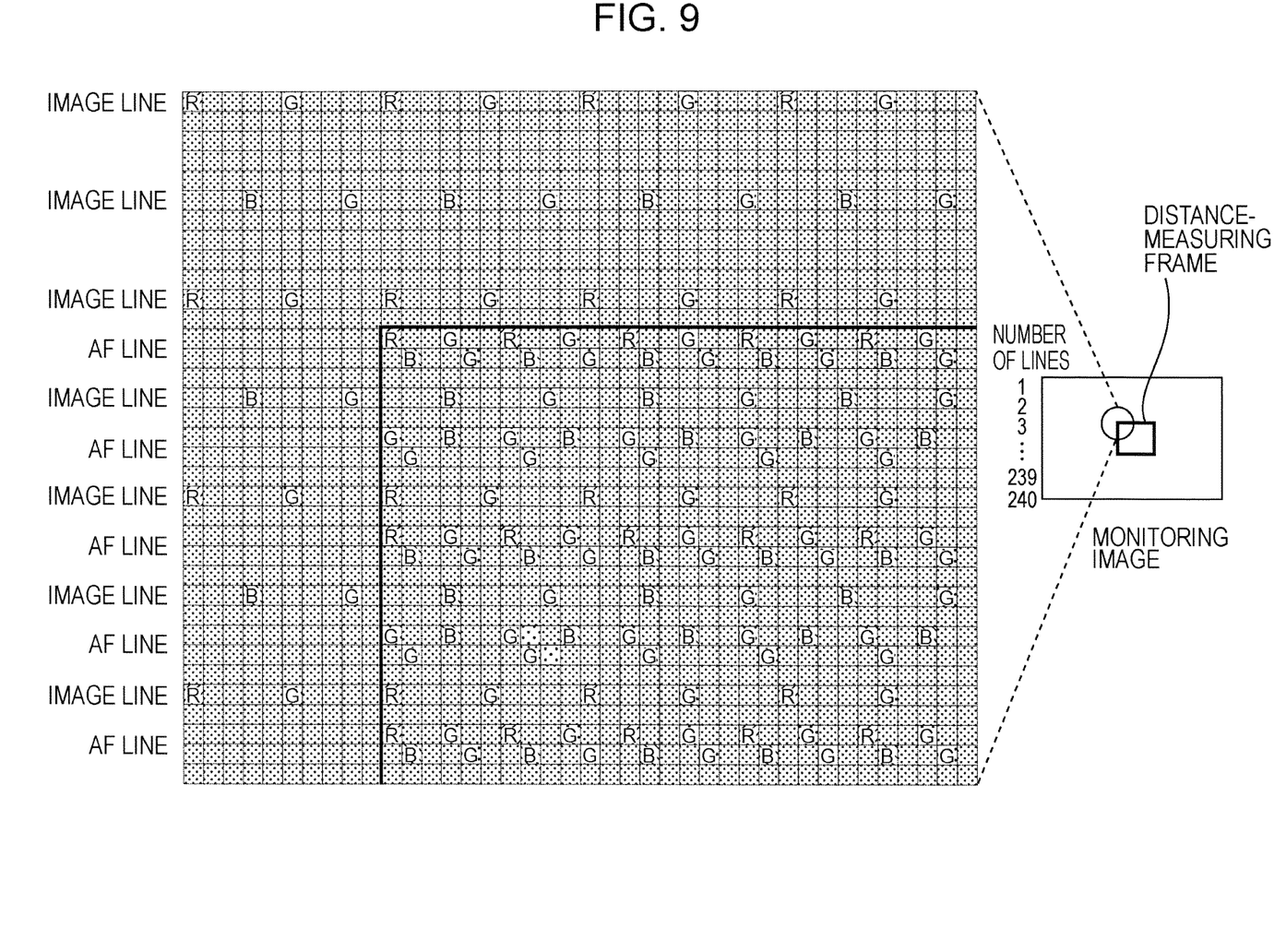
FIG. 9 illustrates the pixels in spot automatic focusing.

FIG. 9 illustrates a pixel image in the spot AF mode (shown in FIG. 8A). Here, an example in which horizontal and vertical ⅕ thinning and horizontal 5-pixel addition are carried out on the monitoring image and horizontal ⅓ thinning (without vertical thinning) and 3-pixel addition are on the AF lines is described.

The amount of data to be AF processed is basically determined on the basis of the area of the CMOS image sensor 30. Therefore, for example, when the vertical length and the horizontal length of the distance-measuring frame (AF frame) are ¼ and ⅕, respectively, of the entire screen, the processing time is 1/20 of the time V required for reading out one field (i.e., the field cycle (display cycle of the monitoring image)) or, in other words, 20 μs or less. While scanning the AF lines at this speed with the second vertical scanning circuit 33 and scanning the image lines in order at the regular speed for reading out one field with the first vertical scanning circuit 32, the monitoring image can be displayed normally, and the speed of the AF processing according to the contrast method can be increased by using an image sensor with 2 million or more pixels for a QVGA display size.

Figure 8B:
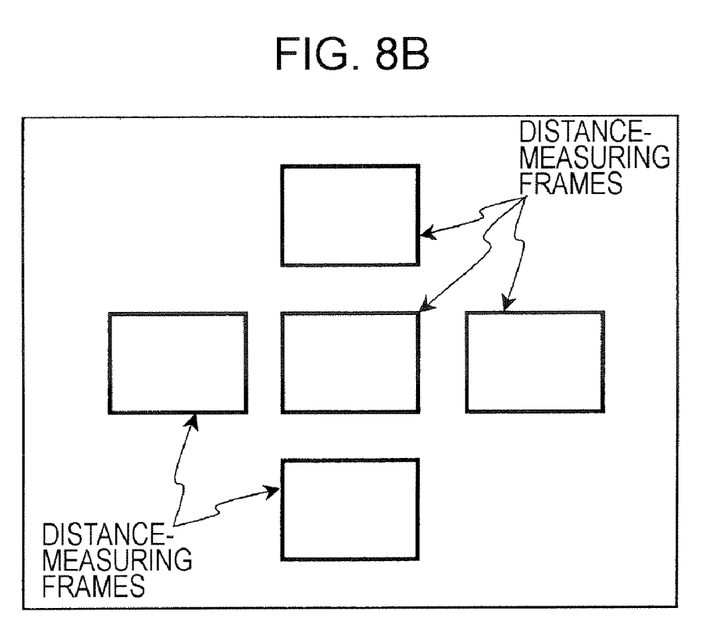

In the 5-point measurement mode, shown in FIG. 8B, the vertical length and the horizontal length of the distance-measuring frame is ¼ and ⅕, respectively, of the image sensor, and the time required for reading out the data in the five distance-measuring frames is 1/20V×5=¼V. In other words, in the 5-point measurement mode using distance-measuring frames having a vertical length and a horizontal length that is ¼ and ⅕, respectively, of the image sensor, the processing time is expected to be four times faster than that of the AF processing using the pixel information of the monitoring image.

Figure 10:
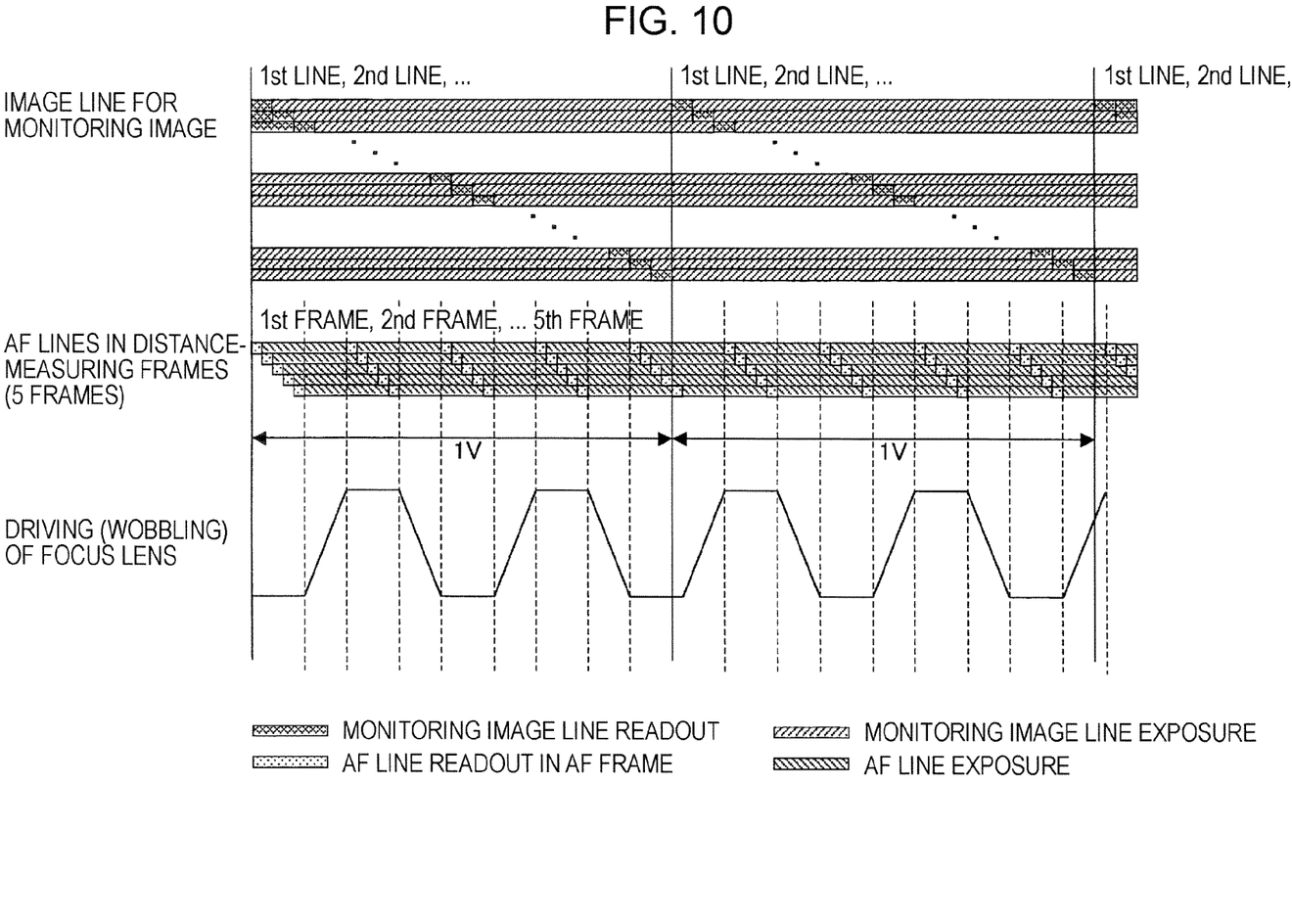
FIG. 10 illustrates the sequence for reading out image lines and AF lines and driving a focus lens when 5-point measurement is carried out by a 2-ch vertical scanning system.

FIG. 10 illustrates a sequence of reading out the image lines and the AF lines and driving (wobbling) the focus lens in the 5-point measurement mode.

The independently operable vertical scanning circuits (2 ch vertical scanning systems) 32 and 33 can independently carry out vertical scanning of the image lines and the AF lines. In this way, the AF processing cycle will not be limited by the monitoring image cycle V. Thus, there is an advantage in that the AF processing time can be set freely.

By clearly separating the image lines and the AF lines without carrying out thinning and addition in the vertical direction during monitoring (i.e., during through-image generation), AF processing can be carried out at a cycle shorter than the monitoring cycle (i.e., monitoring image display cycle) V, thus speeding up the AF processing. At this time, by carrying out pixel addition in the horizontal direction, the affect of random noise is reduced, and the quality of the monitoring image is improved.

When the AF lines are driven at a speed faster than the monitoring cycle V, the exposure time of the AF lines becomes shorter than that of the image lines. Thus, as described above, it is effective to carry out AF processing by increasing the gain for the AF lines.

The CMOS image sensor according to this embodiment is capable of carrying out signal processing in parallel for the image lines and the AF lines, by providing, in addition to the regular row signal lines 311 and the row selection lines 313, the row signal lines 312 and the row selection lines 314 that are exclusively use for autofocus and by independently driving the image lines and the AF lines while displaying a through-image during monitoring. Accordingly, since AF processing can be carried out asynchronously with the V cycle, the flexibility of the autofocus is increased, and the speed of driving can be increased. However, when capturing an image, the timings of all pixels are matched to generate an image.

Modification of First Embodiment

According to the above-described embodiment, vertical scanning of the image lines and the AF lines are carried out independently using the independently operable vertical scanning circuits 32 and 33. Instead, however, the vertical scanning circuit 32 for image line scanning can be constituted of an address decoder and can be used for scanning the AF lines (in other words, a 1-ch vertical scanning system may be employed). In such a case, only one system will be required for the output system.

In this case, similar to the case in which the 2-ch vertical scanning system is employed, horizontal and vertical ⅕ thinning and horizontal 5-pixel addition are carried out on the monitoring image, and horizontal ⅓ thinning and 3-pixel addition (without vertical thinning) are carried out on the AF lines. For example, when the vertical length and the horizontal length of the distance-measuring frame are ¼ and ⅕, respectively, of the entire image sensor, the processing time is 1/20 of the time V required for reading out one field.

By scanning the AF lines at this speed while scanning the image lines in order at the normal speed for reading out one field, the monitoring image can be displayed normally and the speed of the AF processing according to the contrast method can be increased by using an image sensor of 2 million or more pixels when the display size is a QVGA size.

The sequence of scanning the image lines and the AF lines by a single vertical scanning circuit (1 ch scanning system) 32 will be described below in detail.

Figure 11:
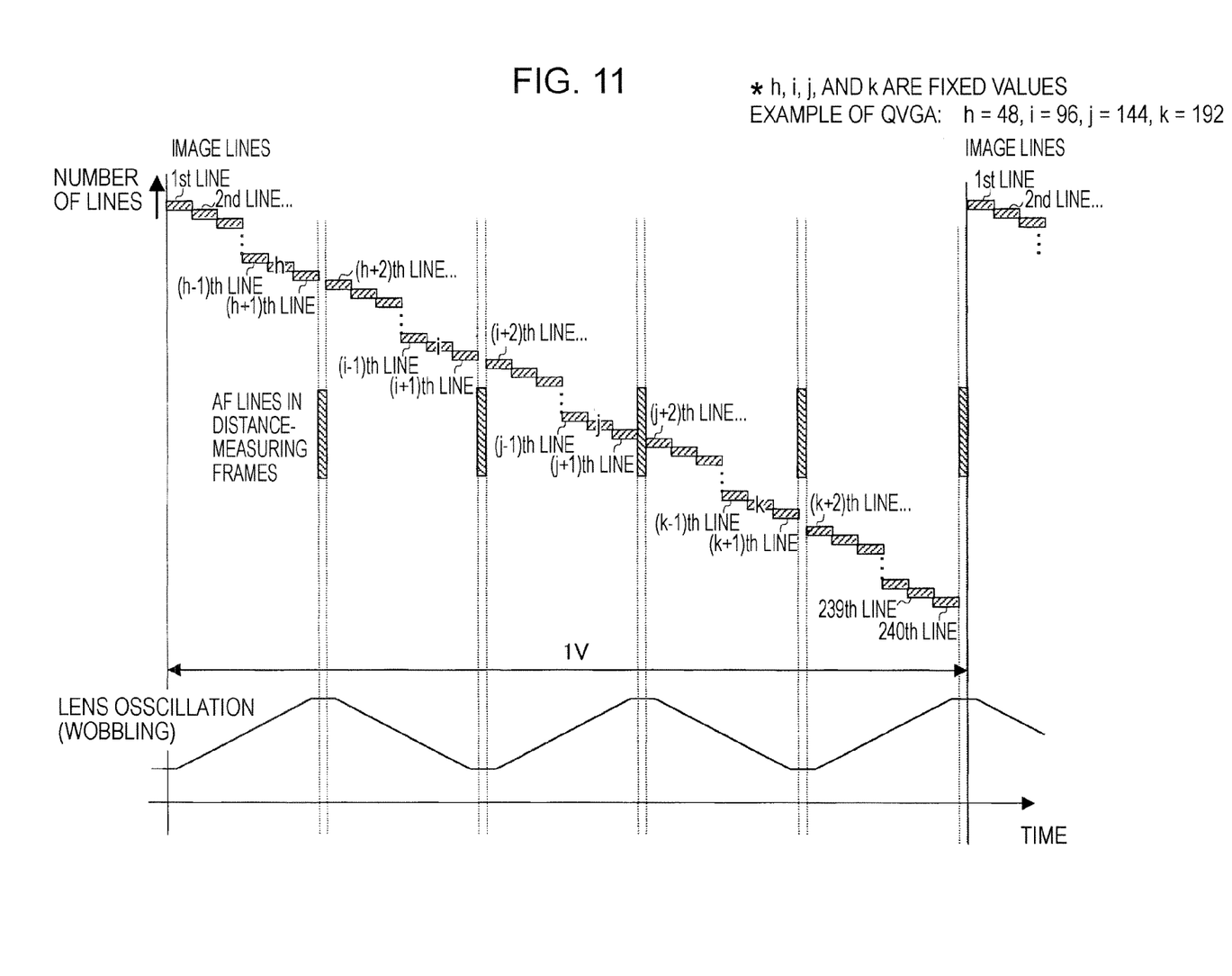
FIG. 11 illustrates the sequence for reading out image lines and AF lines and driving a focus lens when spot automatic focusing is carried out by a 1-ch vertical scanning system.

FIG. 11 illustrates the sequence for reading out image lines and AF lines and driving (wobbling) the focus lens in the spot AF mode (shown in FIG. 8A).

As shown in FIG. 11, first, pixel information of the image lines is read out by vertical scanning carried out by the single vertical scanning circuit 32. At this time, horizontal scanning is carried out by the horizontal scanning circuit 40 to carry out horizontal pixel thinning and addition. Then, for example, when a 200-million pixel image sensor and a QVGA monitor are used, the image lines are read out in, for example, five scanning operations and all AF lines in the distance-measuring frame are read out in between the scanning operations for the image lines.

More specifically, when 1 to 48 image lines obtained by carried out horizontal ⅕ thinning and 5-pixel addition are read out, all AF lines (obtained by horizontal ⅓ thinning and 3-pixel addition) in the distance-measuring frame are read out. When the readout process of the AF lines in the distance-measuring frame is completed, image lines are read out again from the 49th line. When the 96th line is read out, all AF lines in the distance-measuring frame are read out again.

At this time, the exposure time of the AF lines is equal to the time period from the end of the first readout process to the beginning of the second readout process. Since this is significantly shorter than the exposure time of the image lines, the gain may be increased to a suitable level when reading out the AF lines.

By alternately repeating the operations of reading out of the image lines and reading out the AF lines in the distance-measuring frame to the 240th image line, for example, AF processing can be carried out five times during one V cycle. In other words, the time required for carrying out AF processing one time is ⅕ of one V cycle.

The scanning of the image lines and the AF lines in the distance-measuring frame by the single vertical scanning circuit 32 is carried out by repeating the operations of reading out a predetermined number of image lines and reading out the AF lines in the distance-measuring frame up to the final image line. This scanning operation by the single vertical scanning circuit 32 can be easily carried out by programming the controlling circuit 43 (refer to FIG. 3) that drives and controls the vertical scanning circuit 32 in advance on the basis of the line addresses of the lines and their orders to be scanned.

Since the operations for reading out all AF lines in the distance-measuring frame are carried out in between the operations of reading out the image line when displaying a monitoring image, pixel information for the monitoring image is intermittently output from the CMOS image sensor. However, since the pixel information of the image lines is interrupted only for an extremely short amount of time, no visual discomfort is caused by the interruption. Therefore, the interruption does not cause any problems in practical application.

By employing a structure in that the image data intermittently output from the CMOS sensor is stored in order in, for example, the SDRAM 14 (refer to FIG. 1) and then is output to the image displaying unit 13 (refer to FIG. 1) after image data equivalent to one screen (i.e., one field) is stored, the continuity of the image data of one screen can be maintained.

Figure 12:
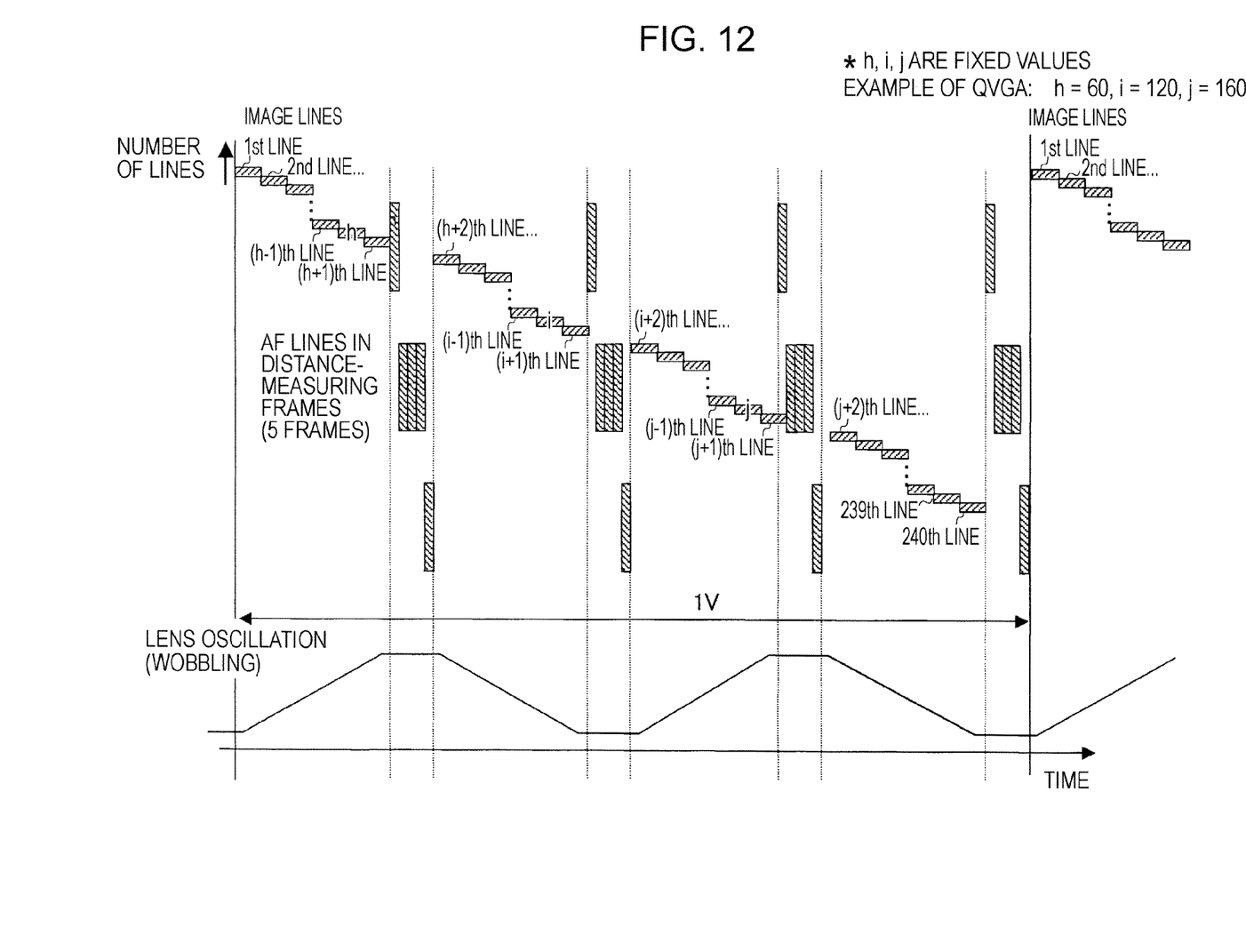
FIG. 12 illustrates the sequence for reading out image lines and AF lines and driving a focus lens when 5-point measurement is carried out by a 1-ch vertical scanning system.

FIG. 12 illustrates the sequence of reading out image lines and AF lines and driving (wobbling) the focus lens in the 5-point measurement mode (shown in FIG. 8B).

When the same concept for the spot AF mode is employed to the 5-point measurement mode, the sequence will be as shown in FIG. 12. Since the number of AF lines to be detected and processed increase by the number of distance-measuring frames to be read out, the speed of the AF processing is decreased compared with that in the spot AF mode. Here, a case in which AF processing is carried out four times during one V cycle will be described.

Often in autofocus according to the contrast method, wobbling is carried out to increase the speed of AF processing. Wobbling is carried out by comparing evaluation values obtained by oscillating the focus lens within the depth of field and moving the focusing lens toward the direction of the greater evaluation value.

Normally, to carry out autofocus according to the contrast method while displaying a monitoring image, the focus lens must has to be oscillated at the V cycle because sample extraction is carried out at a V cycle. To increase the speed of AF processing according to the contrast method combined with wobbling, the oscillation cycle of the focus lens also has to be shortened. However, as shown in FIGS. 11 and 12, there is an advantage in that the driving speed of the focus lens can be suppressed compared to a case in which the readout speed from the image sensor is increased by simply shortening the V cycle.

As described above, when the image lines and the AF lines are vertically scanned at different cycles, there is a problem in that, when exposure is carried out in accordance with the monitoring image, the light-storing time of the AF lines is reduced, and data for AF detection becomes difficult to obtain. Thus, it is effective to employ a method for increasing the gain when data is read out from the AF lines.

According to the above-described embodiment, a CMOS image sensor is employed. However, the present invention is not limited to a CMOS image sensor, and other X-Y address type solid-state image-pickup devices or charge-transfer type solid-state image-pickup devices, such as CCD image sensors, may be employed.

However, for a charge-transfer type solid-state image-pickup device, unlike an X-Y address type solid-state image-pickup device, pixel information cannot be read out for each pixel and, instead, the information of all pixels is read out to a vertical transfer channel at once and is output through a horizontal transfer channel. Therefore, when employing a charge-transfer type solid-state image-pickup device, the exposure time of the pixel information read out at once is set in accordance to the AF processing time, this readout operation is repeated a plurality of times, and the pixel information read out each time is added at the memory and can be used as a monitoring image.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image-pickup device comprising:
   a pixel array unit including pixels two-dimensionally arranged in a matrix, each pixel having a photoelectric transducer;
   a first scanning means for reading out first pixel information from a first set of rows connected to the first scanning means, the first pixel information corresponding to a number of pixels less than the number of pixels included in the pixel array unit as monitoring image information; and
   a second scanning means for, in parallel, reading out second pixel information from a second set of rows connected to the second scanning means, the second pixel information corresponding to a predetermined region in the pixel array unit at a cycle shorter than the display cycle of the monitoring image as autofocus image information,
   wherein the reading out of the second pixel information is driven by a driving signal.

2. The solid-state image-pickup device according to claim 1, wherein the second scanning means adds the information of the pixels in a row to be read out and reads out the added information as autofocus image information and the first scanning means adds the information of the pixels in a row to be read out and reads out the added information as monitoring image information.

3. The solid-state image-pickup device according to claim 1, wherein the first scanning means scans a predetermined number of lines from a first line of pixels read out as the monitoring image information and scans all lines in the predetermined region up to a last line.

4. A method of driving a solid-state image-pickup device including pixels two-dimensionally arranged in a matrix, each pixel having a photoelectric transducer, the method comprising:

reading out, at a first scanning unit, first pixel information from a first set of rows connected to the first scanning unit, the first pixel information corresponding to a number of pixels less than the number of pixels included in the pixel array unit as monitoring image information; and reading out, at a second scanning unit, second pixel information from a second set of rows connected to the second scanning unit, the second pixel information corresponding to a predetermined region in the pixel array unit in parallel to the reading out pixel information corresponding to a number of pixels less than the number of pixels included in the pixel array unit, at a cycle shorter than the display cycle of the monitoring image as autofocus image information, wherein the reading out of the second pixel information is driven by a driving signal.

5. An image-pickup apparatus comprising:

a solid-state image-pickup device including pixels two-dimensionally arranged in a matrix, each pixel having a photoelectric transducer;

an optical system including a focus lens for forming an image of an object on an imaging plane of the solid-state image-pickup device; and controlling means for driving the focus lens in the optical axis direction on the basis of an output signal from the solid-state image-pickup device, wherein the solid-state image-pickup device includes a first scanning means for reading out first pixel information from a first set of rows connected to the first scanning means, the first pixel information corresponding to a number of pixels less than the number of pixels included in the pixel array unit as monitoring image information and a second scanning means for, in parallel, reading out second pixel information from a second set of rows connected to the second scanning means, the second pixel information corresponding to a predetermined region in the pixel array unit at a cycle shorter than the display cycle of the monitoring image as autofocus image information, wherein the reading out of the second pixel information is driven by a driving signal, and wherein the controlling means drives and controls the focus lens on the basis of the autofocus image information.

6. A solid-state image-pickup device comprising:

a pixel array unit including pixels two-dimensionally arranged in a matrix, each pixel having a photoelectric transducer;

a first scanning unit configured to read out first pixel information from a first set of rows connected to the first scanning unit, the first pixel information corresponding to a number of pixels less than the number of pixels included in the pixel array unit as monitoring image information and, a second scanning unit configured to, in parallel, read out second pixel information from a second set of rows connected to the second scanning unit, the second pixel information corresponding to a predetermined region in the pixel array unit at a cycle shorter than the display cycle of the monitoring image as autofocus image information, wherein the read out of the second pixel information is driven by a driving signal.

7. An image-pickup apparatus comprising:

a solid-state image-pickup device including pixels two-dimensionally arranged in a matrix, each pixel having a photoelectric transducer;

an optical system including a focus lens for forming an image of an object on an imaging plane of the solid-state image-pickup device; and a controlling unit for driving the focus lens in the optical axis direction on the basis of an output signal from the solid-state image-pickup device, wherein the solid-state image-pickup device includes a first scanning unit configured to read out first pixel information from a first set of rows connected to the first scanning unit, the first pixel information corresponding to a number of pixels less than the number of pixels included in the pixel array unit as monitoring image information and a second scanning unit configured to, in parallel, read out second pixel information from a second set of rows connected to the second scanning unit, the second pixel information corresponding to a predetermined region in the pixel array unit at a cycle shorter than the display cycle of the monitoring image as autofocus image information, wherein the read out of the second pixel information is driven by a driving signal, and wherein the controlling unit drives and controls the focus lens on the basis of the autofocus image information.

8. The solid-state image-pickup device according to claim 1, wherein the driving signal causes the second pixel information to be read out by the second scanning means asynchronously at a rate different from a rate at which the first pixel information is read out by the first scanning means.

* * * * *